(12) United States Patent
Meyer et al.

(10) Patent No.: US 7,882,042 B2
(45) Date of Patent: Feb. 1, 2011

(54) AUTOMATED PRINTING OF RETURN LABELS

(75) Inventors: F. Bruce Meyer, Webster, NY (US); Heiko Rommelmann, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 614 days.

(21) Appl. No.: 11/937,570

(22) Filed: Nov. 9, 2007

(65) Prior Publication Data

US 2009/0125317 A1    May 14, 2009

(51) Int. Cl.
  *G06Q 30/00*    (2006.01)
  *G03G 15/00*    (2006.01)
  *G06F 11/00*    (2006.01)
(52) U.S. Cl. .......................... 705/330; 705/26; 399/24; 714/44
(58) Field of Classification Search .................. 705/26, 705/330; 399/24; 714/44
  See application file for complete search history.

(56) References Cited

U.S. PATENT DOCUMENTS

| 6,032,004 | A | 2/2000 | Mirabella, Jr. et al. |
| 6,975,817 | B2 | 12/2005 | Rommelmann et al. |
| 7,069,236 | B1 | 6/2006 | Tsunenari |
| 7,526,215 | B2 * | 4/2009 | Moodie et al. ................ 399/24 |
| 2003/0026620 | A1 | 2/2003 | Gallivan |
| 2004/0212833 | A1 | 10/2004 | Taskett et al. |
| 2005/0143956 | A1 * | 6/2005 | Long et al. .................. 702/184 |
| 2005/0271415 | A1 * | 12/2005 | Burchette et al. ........... 399/109 |
| 2007/0097161 | A1 * | 5/2007 | Ejiri et al. ...................... 347/5 |

FOREIGN PATENT DOCUMENTS

JP          2001142803   A   *   5/2001

* cited by examiner

*Primary Examiner*—Fadey S Jabr
(74) *Attorney, Agent, or Firm*—Gibb I.P. Law Firm, LLC

(57) ABSTRACT

Embodiments herein provide for the automated printing of a shipping label as part of the software/memory of the customer replaceable unit (CRU). Such printing is controlled by information carried in the module itself. Thus, the embodiments work with exhaustible modules that include their own memory and potentially include their own module processor (that are contained within the exhaustible module and are separate from the memory and processor of the printing device).

20 Claims, 2 Drawing Sheets

AUTOMATED PRINTING OF RETURN LABELS

BACKGROUND AND SUMMARY

Embodiments herein generally relate to a printing apparatus and exhaustible modules (modules that are regularly replaced) used within such a printing apparatus, and more particularly relates to an exhaustible module that stores a return address that is to be included on a return shipping label that is automatically printed by the printing apparatus when the useful life of the exhaustible module is at its end.

The exhaustible module (customer replaceable units (CRU's)) comprises either material to be consumed and/or parts that will wear out. When the material is consumed and/or the parts are worn out, the exhaustible module is replaced by the end user of the printing device. The printing device includes a central processor, a graphic user interface operatively connected to the central processor, and a printing engine operatively connected to the central processor. There is at least one of the exhaustible modules within the printing apparatus that is also operatively connected to the central processor. The printing device comprises an electrostatographic device and/or xerographic device.

Some replacement modules are shipped to the customer with return shipping labels in the box for customer use in returning the units. Alternatively, instruction sheets are sometimes included with the replacement module directing the customers to a website from which a shipping label may be printed. Including such labels and instructions adds to manufacturing cost and complexity. An even larger issue is that such labels continue to be copied and used by customers even after discontinuation of return programs, or change of address of the entity processing such returned modules, resulting in excessive shipping and handling costs.

Therefore, embodiments herein provide for the automated printing of one shipping label per module as part of the software/memory of the customer replaceable unit (CRU) that has memory (a customer replaceable unit memory or "CRUM"). Such printing is controlled by information carried in the module itself. Thus, the embodiments work with exhaustible modules that include their own memory and potentially include their own module processor (that are contained within the exhaustible module and are separate from the memory and processor of the printing device). For a complete discussion of programmable modules see U.S. Pat. No. 6,975,817, the complete disclosure of which is incorporated herein by reference.

The electronic memory stores the return address, which is specific to the exhaustible module. The exhaustible module has a useful life shorter than the useful life of the apparatus, such that the exhaustible module is adapted to be regularly consumed and replaced a plurality of times during the useful life of the apparatus. When a predetermined amount of the useful life of the exhaustible module has expired, the processor of the printing device is adapted to generate the module replacement notice (or the module processor, if so equipped, is adapted to send the module replacement notice to the central processor). The module replacement notice includes the return address.

The central processor is adapted to automatically provide the module replacement notice to the user through the graphic user interface and to automatically print, using the printing engine, the return shipping label that has the return address for use in shipping the exhaustible module back to the manufacturer or to a refurbishing/recycling processor after the consumed exhaustible module is removed from the apparatus.

One feature of embodiments herein is that the return address can be stored only in the electronic memory of the exhaustible module. Therefore, each different exhaustible module can be sent to a different address and this address can be changed from time to time (as the manufacturer of the exhaustible module so desires) because each time an exhaustible module is manufactured or refurbished, a different address can be stored on the exhaustible module memory (CRUM) before being supplied to the user. This allows module manufacturers to balance the flow of returned modules among multiple refurbish/recycle locations, and/or allows the module manufacturer to ensure that it receives back the modules that it has manufactured (for testing and quality control purposes). Similarly, by including the return address in the exhaustible module memory, different contractual obligations with different refurbish/recycle vendors can be honored by a module manufacturer, so that the vendors receive their contracted for levels of consumed modules.

The module replacement notice can also include information regarding the remaining useful life amount of the exhaustible module (calculated by either the printing device processor or the module processor) which allows the central processor to provide the remaining useful life amount to the user through the graphic user interface. In some embodiments, in response to the module exhaustion notice, one of the processors can be further adapted to automatically order a replacement exhaustible module.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As discussed above, embodiments herein relate to exhaustible modules (modules that are regularly replaced) used within printing devices. With embodiments herein, the exhaustible module stores a return address. This return address is to be included on a return shipping label that is automatically printed by the printing apparatus when the useful life of the exhaustible module is at its end.

Embodiments herein store the return shipping information in the customer replaceable unit memory (CRUM) at the time of production of the customer replaceable unit (CRU). At some point, before the actual end of the useful life of the exhaustible module (CRU), e.g., at the re-order warning trip point, the processor in the printing apparatus, or the processor in the exhaustible module (if so equipped) causes the printing apparatus to automatically print out the return shipping label. The replacement module can supply the address, account number, routing information, etc., for the return shipping label.

Figure 1:
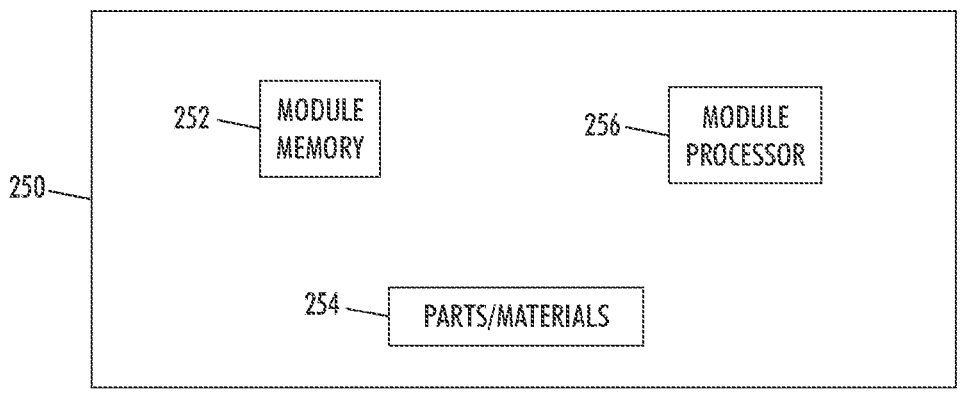
FIG. 1 is a schematic diagram illustrating a module according to embodiments herein.

As shown in FIG. 1, the exhaustible module (CRU) 250 comprises either material to be consumed and/or parts that will wear out 254. For example, the exhaustible module (customer replaceable unit) can comprise ink or toner containers, drums, fusers, etc. 254. When the material is consumed and/or the parts are worn out, the exhaustible module (CRU) 250 is replaced by the end user of the printing device. As discussed below with respect to FIG. 3, the printing device includes a central processor 80, a graphic user interface 83 operatively connected to the central processor, and a printing engine (photoreceptor 10 and associated components) operatively connected to the central processor 80. There is at least one of the exhaustible modules (e.g., development units 42, 57, 67, rollers 109, 113, belts, 11, 23, 25, etc.) within the printing apparatus that is also operatively connected to the central processor. The exemplary printing device shown in FIG. 3 comprises an electrostatographic device and/or xerographic device, but can comprise any form of printing device.

As shown in FIG. 1, the exhaustible module (CRU) 250 includes its own memory 252 and can include its own module processor 256. The module memory 252 and module processor 256 are contained within the exhaustible module (CRU) 250 and are separate and distinct from the memory and processor 80 of the printing device. The electronic memory 252 stores the return address, which is specific to the exhaustible module (CRU) 250. The exhaustible module (CRU) 250 has a useful life shorter than the useful life of the apparatus, such that the exhaustible module (CRU) 250 is adapted to be regularly consumed (exhausted) and replaced a plurality of times during the useful life of the apparatus.

Figure 2:
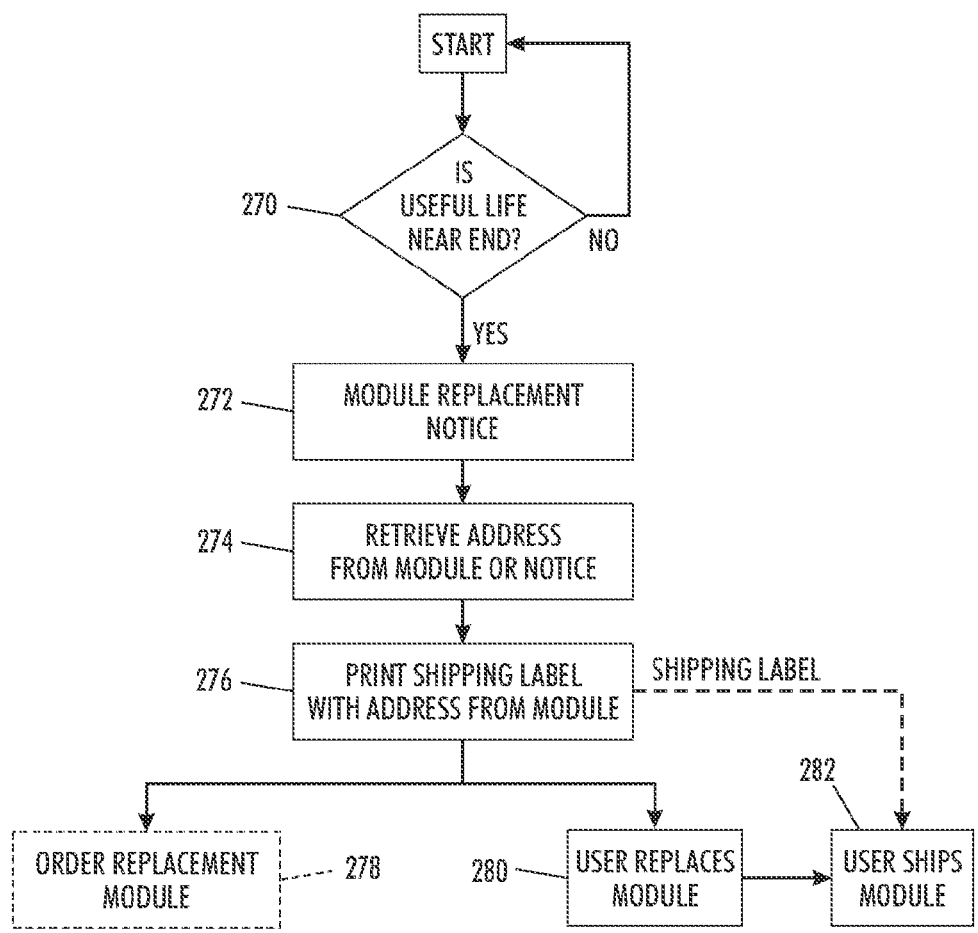
FIG. 2 is a flow diagram illustrating embodiments herein.

As shown in flowchart form in FIG. 2, when a predetermined amount of the useful life of the exhaustible module (CRU) 250 has expired (item 270), the processor 80 of the printing device is adapted to generate the module replacement notice (or the module processor 256, if so equipped, is adapted to send the module replacement notice to the central processor 80) in item 272. The module replacement notice sent to the central processor 80 from the module processor 256 can include additional information such as the return address, billing account number, routing information, etc., for that specific exhaustible module (CRU) 250.

The central processor 80 automatically provides the module replacement notice to the user through the graphic user interface in item 272. Either processor (80 or 256) can directly retrieve the return shipping address from the exhaustible module (CRU) 250 or can take the return shipping address information from the module replacement notice, if such information is contained in the notice. Then either processor (80 or 256) causes the printing engine of the printing apparatus to automatically print, using the printing engine, the return shipping label in item 276. The user can be given an option, through the graphic user interface regarding when the shipping label should be printed.

With respect to the printing of the shipping label, many methodologies may be employed. For example, some conventional systems (U.S. Patent Publication 2004/0193436, the complete disclosure of which is incorporated herein by reference) provide a method of printing a label that permits the customer to drop the return package with a carrier without paying shipping charges to the carrier. The label includes an integrated machine readable code, which permits a returns center to easily assess shipping charges and perform other services related to the return. Other conventional systems (U.S. Patent Publication 2004/0212833, the complete disclosure of which is incorporated herein by reference) disclose a system and method for generating a carrier-compliant shipping label for a supplier to transport a product. The embodiments herein can use these or any similar methods and systems.

The user then removes the consumed module and inserts a replacement module (item 280) and uses the shipping label to ship or mail (transport) the module to the appropriate agency, in item 282. Thus, the return address that is stored in the module memory 252 is used for shipping the exhaustible module (CRU) 250 back to the manufacturer or to a refurbishing/recycling processor (item 282) after the consumed exhaustible module (CRU) 250 is removed from the apparatus by the user in item 280. Many times, the return label in item 276 comprises a pre-paid shipping label.

Note that the steps shown in FIG. 2 can be performed in any logical order and do not need to be performed in the order shown. For example, the replacement module can be used to provide the address to which the exhausted module is to be sent. Therefore, in some embodiments, the substitution of the replacement module for the exhausted module in item 280 is actually performed before the address is retrieved in item 274 to allow either processor (80 or 256) to retrieve the return shipping address from the newly inserted replacement module.

Regardless of the order that the steps are taken, one feature of embodiments herein is that the return address is stored only in the electronic memory 252 of the exhaustible module (CRU) 250 and does not need to be stored in the memory of the central processor 80. Therefore, each different exhaustible module (CRU) 250 can maintain a different address and be sent to a different address after it is exhausted and removed from the printing apparatus.

Given the availability of sufficient memory space within the memory of the module, such information could be as complex as a file containing a complete, digitized shipping label for the preferred carrier including the way-bill number. Depending on program preference the latter could be stored in numeric form, barcode form or both. Alternatively, there may be only a limited amount of space within the module memory 252. In such situations the entire shipping form can be pre-loaded in the printing apparatus memory 80, leaving only the way-bill number itself to be stored in the module memory 252. This way-bill number is added to the shipping form by the printing apparatus processor 80 at the time of printing of the form.

Another embodiment can allow the user to supply the appropriate blank shipping form (or such a blank form can be included in the box with the replacement module). In this case the printing apparatus would only have to access the module memory 252 for items such as the name of the shipper and address. Changes in shipper, address, etc., over the life of a product can easily be accommodated by the changes to the information stored in the module memory during module production. The module memory 252 can also be used to indicate to the user that the return of the module is no longer necessary or available.

The return shipping address that is used within the exhaustible modules can be changed from time to time (as the manufacturer of the exhaustible module (CRU) 250 so desires) because each time an exhaustible module (CRU) 250 is manufactured or refurbished, a different address can be stored on the exhaustible module memory 252 before being supplied to the user. This allows module manufacturers to balance the flow of returned modules among multiple refurbish/recycle locations, and/or allows the module manufacturer to ensure that it receives back the modules that it has manufactured (for testing and quality control purposes). Similarly, by including the return address in the exhaustible module memory 252, different contractual obligations with different refurbish/recycle vendors can be honored by a module manufacturer, so that the vendors receive their contracted levels of consumed modules that need to be refurbished.

The module replacement notice 272 can also include information regarding the remaining useful life amount of the exhaustible module (calculated by either the printing device processor 80 or the module processor 256) which allows the central processor 80 to provide the remaining useful life amount to the user through the graphic user interface. In some embodiments, in response to the module exhaustion notice, one of the processors can be further adapted to automatically order a replacement exhaustible module as shown in item 278.

Figure 3:
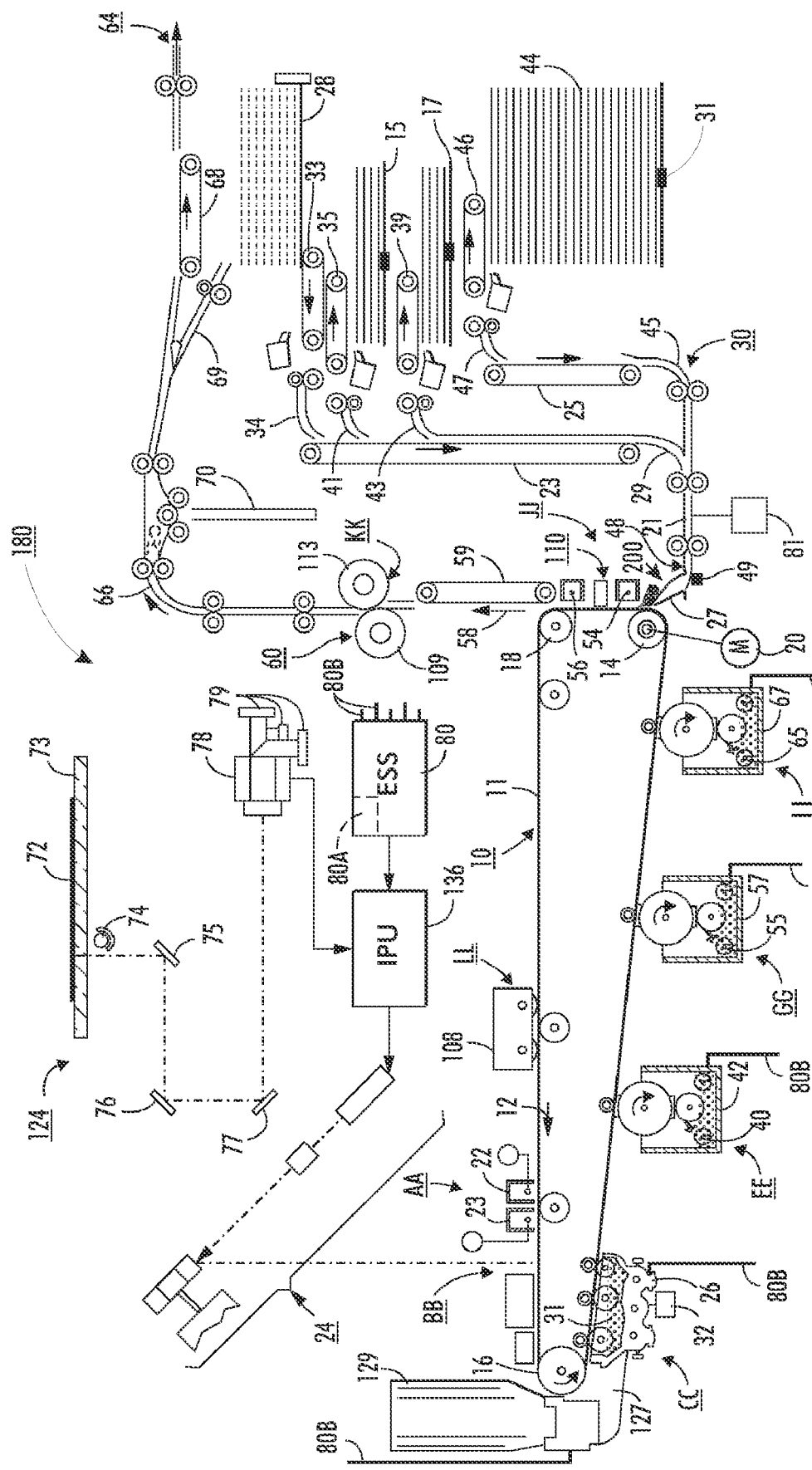
FIG. 3 is a cross-sectional schematic representation of an apparatus embodiment herein.

While some embodiments herein include just the module itself, other embodiments comprise an entire printing device that includes many components, as shown in FIG. 3. The controller 80 of the printing apparatus operates the various components to produce a result. For example, in the case of a printing device, the controller 80 controls the components to cause the components to print markings on printing media. Once the apparatus has been operating for any significant amount of time, it will have fully used components and partially used components.

Further, the software needed to accomplish the data processing can take many different forms. For example, U.S. Pat. No. 7,069,236, the complete disclosure of which is incorporated herein by reference, facilitate the return of spent, recyclable products from a consumer to a destination pre-selected by the manufacturer for recycling. Such a system uses a computer, located on a network, that is adapted to: (a) receive from another computer located on the network consumer information which includes an identification of the consumer product to be returned; and (b) transmit to the other computer shipping label data which includes an identification of a destination for the consumer product, selected in accordance with the consumer information, and an identification of a carrier service.

Thus, embodiments herein include a device that has the ability to print and which may also be able to scan and perform processing on documents, communicate with remote entities, etc. There are many devices currently available that have these abilities, such as copiers, fax machines, multifunction printers, etc., and the embodiments herein are intended to operate with all such machines as well as other devices. The term "printing device" as used herein encompasses any such digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Norwalk, Conn., USA. Such printers commonly include input/output, power supplies, processors, media movement devices, marking devices etc., the details of which are omitted herefrom to allow the reader to focus on the salient aspects of the embodiments described herein. FIG. 3 illustrates an exemplary device in which the module embodiments herein operate with high effectiveness.

More specifically, FIG. 3 illustrates an exemplary electrostatographic reproduction machine, for example, a multipass color electrostatographic reproduction machine 180. As is well known, the color copy process typically involves a computer generated color image which may be conveyed to an image processor 136, or alternatively a color document 72 which may be placed on the surface of a transparent platen 73. A scanning assembly 124, having a light source 74 illuminates the color document 72. The light reflected from document 72 is reflected by mirrors 75, 76, and 77, through lenses (not shown) and a dichroic prism 78 to three charged-coupled linear photosensing devices (CCDs) 79 where the information is read. Each CCD 79 outputs a digital image signal the level of which is proportional to the intensity of the incident light. The digital signals represent each pixel and are indicative of blue, green, and red densities. They are conveyed to the IPU 136 where they are converted into color separations and bit maps, typically representing yellow, cyan, magenta, and black. IPU 136 stores the bit maps for further instructions from an electronic subsystem (ESS).

The ESS is preferably a self-contained, dedicated mini-computer having a central processor unit (CPU), electronic storage, and a display or graphic user interface (GUI) 83. The ESS is the control system which, with the help of sensors, and connections 80B as well as a pixel counter 80A, reads, captures, prepares and manages the image data flow between IPU 136 and image input terminal 124. In addition, the ESS 80 is the main multi-tasking processor for operating and controlling all of the other machine subsystems and printing operations. These printing operations include imaging, development, sheet delivery and transfer, and particularly control of the sequential transfer assist blade assembly. Such operations also include various functions associated with subsequent finishing processes. Some or all of these subsystems may have micro-controllers that communicate with the ESS 80.

The multipass color electrostatographic reproduction machine 180 employs a photoreceptor 10 in the form of a belt having a photoconductive surface layer 11 on an electroconductive substrate. The surface 11 can be made from an organic photoconductive material, although numerous photoconductive surfaces and conductive substrates may be employed. The belt 10 is driven by means of motor 20 having an encoder attached thereto (not shown) to generate a machine timing clock. Photoreceptor 10 moves along a path defined by rollers 14, 18, and 16 in a counter-clockwise direction as shown by arrow 12.

Initially, in a first imaging pass, the photoreceptor 10 passes through charging station AA where a corona generating devices, indicated generally by the reference numeral 22, 23, on the first pass, charge photoreceptor 10 to a relatively high, substantially uniform potential. Next, in this first imaging pass, the charged portion of photoreceptor 10 is advanced through an imaging station BB. At imaging station BB, the uniformly charged belt 10 is exposed to the scanning device 24 forming a latent image by causing the photoreceptor to be discharged in accordance with one of the color separations and bit map outputs from the scanning device 24, for example black. The scanning device 24 is a laser Raster Output Scanner (ROS). The ROS creates the first color separatism image in a series of parallel scan lines having a certain resolution, generally referred to as lines per inch. Scanning device 24 may include a laser with rotating polygon mirror blocks and a suitable modulator, or in lieu thereof, a light emitting diode array (LED) write bar positioned adjacent the photoreceptor 10.

At a first development station CC, a non-interactive development unit, indicated generally by the reference numeral 26, advances developer material 31 containing carrier particles and charged toner particles at a desired and controlled concentration into contact with a donor roll, and the donor roll then advances charged toner particles into contact with the latent image and any latent target marks. Development unit 26 may have a plurality of magnetic brush and donor roller members, plus rotating augers or other means for mixing toner and developer. These donor roller members transport negatively charged black toner particles for example, to the latent image for development thereof which tones the particular (first) color separation image areas and leaves other areas untoned. Power supply 32 electrically biases development unit 26. Development or application of the charged toner particles as above typically depletes the level and hence concentration of toner particles, at some rate, from developer material in the development unit 26. This is also true of the other development units (to be described below) of the machine 180.

On the second and subsequent passes of the multipass machine 180, the pair of corona devices 22 and 23 are employed for recharging and adjusting the voltage level of both the toned (from the previous imaging pass), and untoned areas on photoreceptor 10 to a substantially uniform level. A power supply is coupled to each of the electrodes of corona recharge devices 22 and 23. Recharging devices 22 and 23 substantially eliminate any voltage difference between toned areas and bare untoned areas, as well as to reduce the level of residual charge remaining on the previously toned areas, so that subsequent development of different color separation toner images is effected across a uniform development field.

Imaging device 24 is then used on the second and subsequent passes of the multipass machine 180, to superimpose subsequent a latent image of a particular color separation image, by selectively discharging the recharged photoreceptor 10. The operation of imaging device 24 is of course controlled by the controller, ESS 80. One skilled in the art will recognize that those areas developed or previously toned with black toner particles will not be subjected to sufficient light from the imaging device 24 as to discharge the photoreceptor region lying below such black toner particles. However, this is of no concern as there is little likelihood of a need to deposit other colors over the black regions or toned areas.

Thus on a second pass, imaging device 24 records a second electrostatic latent image on recharged photoreceptor 10. Of the four development units, only the second development unit 42, disposed at a second developer station EE, has its development function turned "on" (and the rest turned "off") for developing or toning this second latent image. As shown, the second development unit 42 contains negatively charged developer material 40, for example, one including yellow toner. The toner 40 contained in the development unit 42 is thus transported by a donor roll to the second latent image recorded on the photoreceptor 10, thus forming additional toned areas of the particular color separation on the photoreceptor 10. A power supply (not shown) electrically biases the development unit 42 to develop this second latent image with the negatively charged yellow toner particles 40. As will be further appreciated by those skilled in the art, the yellow colorant is deposited immediately subsequent to the black so that further colors that are additive to yellow, and interact therewith to produce the available color gamut, can be exposed through the yellow toner layer.

On the third pass of the multipass machine 180, the pair of corona recharge devices 22 and 23 are again employed for recharging and readjusting the voltage level of both the toned and untoned areas on photoreceptor 10 to a substantially uniform level. A power supply is coupled to each of the electrodes of corona recharge devices 22 and 23. The recharging devices 22 and 23 substantially eliminate any voltage difference between toned areas and bare untoned areas, as well as to reduce the level of residual charge remaining on the previously toned areas so that subsequent development of different color toner images is effected across a uniform development field. A third latent image is then again recorded on photoreceptor 10 by imaging device 24. With the development functions of the other development units turned "off", this image is developed in the same manner as above using a third color toner 55 contained in a development unit 57 disposed at a third developer station GG. An example of a suitable third color toner is magenta. Suitable electrical biasing of the development unit 57 is provided by a power supply, not shown.

On the fourth pass of the multipass machine 180, the pair of corona recharge devices 22 and 23 again recharge and adjust the voltage level of both the previously toned and yet untoned areas on photoreceptor 10 to a substantially uniform level. A power supply is coupled to each of the electrodes of corona recharge devices 22 and 23. The recharging devices 22 and 23 substantially eliminate any voltage difference between toned areas and bare untoned areas as well as to reduce the level of residual charge remaining on the previously toned areas. A fourth latent image is then again created using imaging device 24. The fourth latent image is formed on both bare areas and previously toned areas of photoreceptor 10 that are to be developed with the fourth color image. This image is developed in the same manner as above using, for example, a cyan color toner 65 contained in development unit 67 at a fourth developer station II. Suitable electrical biasing of the development unit 67 is provided by a power supply, not shown.

Following the black development unit 26, development units 42, 57, and 67 are preferably of the type known in the art which do not interact, or are only marginally interactive with previously developed images. For examples, a DC jumping development system, a powder cloud development system, or a sparse, non-contacting magnetic brush development system are each suitable for use in an image on image color development system as described herein. In order to condition the toner for effective transfer to a substrate, a negative pretransfer corotron member negatively charges all toner particles to the required negative polarity to ensure proper subsequent transfer.

Since the machine 180 is a multicolor, multipass machine as described above, only one of the plurality of development units, 26, 42, 57 and 67 may have its development function turned "on" and operating during any one of the required number of passes, for a particular color separation image development. The remaining development units thus have their development functions turned off.

During the exposure and development of the last color separation image, for example by the fourth development unit 65, 67 a sheet of support material is advanced to a transfer station JJ by a sheet feeding apparatus 30. During simplex operation (single sided copy), a blank sheet may be fed from tray 15 or tray 17, or a high capacity tray 44 could thereunder, to a registration transport 21, in communication with controller 81, where the sheet is registered in the process and lateral directions, and for skew position. As shown, the tray 44 and each of the other sheet supply sources includes a sheet size sensor 31 that is connected to the controller 80. One skilled in the art will realize that trays 15, 17, and 44 each hold a different sheet type.

The speed of the sheet is adjusted at registration transport 21 so that the sheet arrives at transfer station JJ in synchronization with the composite multicolor image on the surface of photoconductive belt 10. Registration transport 21 receives a sheet from either a vertical transport 23 or a high capacity tray transport 25 and moves the received sheet to pretransfer baffles 27. The vertical transport 23 receives the sheet from either tray 15 or tray 17, or the single-sided copy from duplex tray 28, and guides it to the registration transport 21 via a turn baffle 29. Sheet feeders 35 and 39 respectively advance a copy sheet from trays 15 and 17 to the vertical transport 23 by chutes 41 and 43. The high capacity tray transport 25 receives the sheet from tray 44 and guides it to the registration transport 21 via a lower baffle 45. A sheet feeder 46 advances copy sheets from tray 44 to transport 25 by a chute 47.

As shown, pretransfer baffles 27 guide the sheet from the registration transport 21 to transfer station JJ. Charge can be placed on the baffles from either the movement of the sheet through the baffles or by the corona generating devices 54, 56 located at marking station or transfer station JJ. Charge limiter 49 located on pretransfer baffles 27 and 48 restricts the amount of electrostatic charge a sheet can place on the baffles 27 thereby reducing image quality problems and shock hazards. The charge can be placed on the baffles from either the movement of the sheet through the baffles or by the corona generating devices 54, 56 located at transfer station JJ. When the charge exceeds a threshold limit, charge limiter 49 discharges the excess to ground.

Transfer station JJ includes a transfer corona device 54 which provides positive ions to the backside of the copy sheet. This attracts the negatively charged toner powder images from photoreceptor belt 10 to the sheet. A detack corona device 56 is provided for facilitating stripping of the sheet from belt 10. A sheet-to-image registration detector 110 is located in the gap between the transfer and corona devices 54 and 56 to sense variations in actual sheet to image registration and provides signals indicative thereof to ESS 80 and controller 81 while the sheet is still tacked to photoreceptor belt 10.

The transfer station JJ also includes the transfer assist blade assembly 200, in which various segmented blades are engaged for contacting the backside of the image receiving sheet. After transfer, the sheet continues to move, in the direction of arrow 58, onto a conveyor 59 that advances the sheet to fusing station KK.

Fusing station KK includes a fuser assembly, indicated generally by the reference numeral 60, which permanently fixes the transferred color image to the copy sheet. Preferably, fuser assembly 60 comprises a heated fuser roller 109 and a backup or pressure roller 113. The copy sheet passes between fuser roller 109 and backup roller 113 with the toner powder image contacting fuser roller 109. In this manner, the multi-color toner powder image is permanently fixed to the sheet. After fusing, chute 66 guides the advancing sheet to feeder 68 for exit to a finishing module (not shown) via output 64. However, for duplex operation, the sheet is reversed in position at inverter 70 and transported to duplex tray 28 via chute 69. Duplex tray 28 temporarily collects the sheet whereby sheet feeder 33 then advances it to the vertical transport 23 via chute 34. The sheet fed from duplex tray 28 receives an image on the second side thereof, at transfer station JJ, in the same manner as the image was deposited on the first side thereof. The completed duplex copy exits to the finishing module (not shown) via output 64.

After the sheet of support material is separated from photoreceptor 10, the residual toner carried on the photoreceptor surface is removed therefrom. The toner is removed for example at cleaning station LL using a cleaning brush structure contained in a unit 108.

As mentioned above, the present embodiments store the return shipping address in the module memory (CRUM). To the contrary, some conventional systems teach that the address should be stored in the printing device memory (e.g., see U.S. Patent Publication 2003/0026620, the complete disclosure of which is incorporated herein by reference) or should be stored in a separate computer (U.S. Pat. No. 7,069,236, mentioned above). The present invention breaks away from such conventional teachings and goes against such teachings by storing the return address in the module memory.

This produces the unexpected benefit that, with the embodiments herein, the return shipping address that is used within the exhaustible modules can be changed from time to time (as the manufacturer of the exhaustible module (CRU) 250 so desires) because each time an exhaustible module (CRU) 250 is manufactured or refurbished, a different address can be stored on the exhaustible module memory 252 before being supplied to the user. Another unexpected benefit is that embodiments herein allow module manufacturers to balance the flow of returned modules among multiple refurbish/recycle locations, and/or allow the module manufacturer to ensure that it receives back the modules that it has manufactured (for testing and quality control purposes). Similarly, by including the return address in the exhaustible module memory 252, different contractual obligations with different refurbish/recycle vendors can be honored by a module manufacturer, so that the vendors receive their contracted levels of consumed modules that need to be refurbished. In addition, with embodiments herein, the apparatus (printer) does not need to be connected to a network (e.g., the internet) in order to retrieve an address, because the full address can be stored within the memory (CRUM) of the customer replaceable unit (CRU).

All foregoing embodiments are specifically applicable to electrostatographic and/or xerographic machines and/or processes as well as to software programs stored on the electronic memory 80 (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. An apparatus comprising:
    a processor;
    a graphic user interface operatively connected to said processor;
    a printing engine operatively connected to said processor; and
    at least one exhaustible module operatively connected to said processor and comprising an electronic memory storing a return address, and further comprising a module processor operatively connected to said electronic memory,
    wherein said exhaustible module has a useful life shorter than a useful life of said apparatus, such that said exhaustible module is adapted to be regularly consumed and replaced a plurality of times during said useful life of said apparatus,
    wherein, when a predetermined amount of said useful life of said exhaustible module has expired, said module processor is adapted to:
        automatically provide a module replacement notice on said graphic user interface; and
        automatically print, using said printing engine, a return shipping label having said return address for use in shipping said exhaustible module after said exhaustible module is removed from said apparatus.

2. The apparatus according to claim 1, wherein said module replacement notice includes a remaining useful life amount of said exhaustible module.

3. The apparatus according to claim 1, wherein said return address is stored only in said electronic memory of said exhaustible module.

4. The apparatus according to claim 1, wherein, when a predetermined amount of said useful life of said exhaustible module has expired, said module processor is further adapted to automatically order a replacement exhaustible module.

5. The apparatus according to claim 1, wherein said exhaustible module comprises a module adapted to be replaced by end users of said apparatus.

6. An apparatus comprising:
a processor;
a graphic user interface operatively connected to said processor;
a printing engine operatively connected to said processor; and
at least one exhaustible module operatively connected to said processor and comprising an electronic memory storing a return address, and further comprising a module processor operatively connected to said electronic memory,
wherein said exhaustible module has a useful life shorter than a useful life of said apparatus, such that said exhaustible module is adapted to be regularly consumed and replaced a plurality of times during said useful life of said apparatus,
wherein, when a predetermined amount of said useful life of said exhaustible module has expired, said exhaustible module is adapted to send a module replacement notice to said processor, wherein said module replacement notice includes said return address;
wherein, in response to said module exhaustion notice, said module processor is adapted to:
automatically provide said module replacement notice to a user through said graphic user interface; and
automatically print, using said printing engine, a return shipping label having said return address for use in shipping said exhaustible module after said exhaustible module is removed from said apparatus.

7. The apparatus according to claim 6, wherein said module replacement notice includes a remaining useful life amount of said exhaustible module, and wherein said processor is further adapted to provide said remaining useful life amount to said user through said graphic user interface.

8. The apparatus according to claim 6, wherein said return address is stored only in said electronic memory of said exhaustible module.

9. The apparatus according to claim 6, wherein, in response to said module exhaustion notice, said module processor is further adapted to automatically order a replacement exhaustible module.

10. The apparatus according to claim 6, wherein said exhaustible module comprises a module adapted to be replaced by end users of said apparatus.

11. An apparatus comprising:
an exhaustible module for use within a printing apparatus; and
an electronic memory within said exhaustible module;
a module processor within said exhaustible module,
wherein said electronic memory is adapted to store a return address,
wherein said exhaustible module has a useful life shorter than a useful life of said printing apparatus, such that said exhaustible module is adapted to be regularly consumed and replaced a plurality of times during said useful life of said printing apparatus,
wherein, when a predetermined amount of said useful life of said exhaustible module has expired, said module processor is adapted to:
automatically provide a module replacement notice on a graphic user interface of said printing apparatus; and
automatically print a return shipping label having said return address for use in shipping said exhaustible module after said exhaustible module is removed from said apparatus.

12. The apparatus according to claim 11, wherein said module replacement notice includes a remaining useful life amount of said exhaustible module.

13. The apparatus according to claim 11, wherein said return address is stored only in said electronic memory of said exhaustible module.

14. The apparatus according to claim 11, wherein, when a predetermined amount of said useful life of said exhaustible module has expired, said module processor is further adapted to automatically order a replacement exhaustible module.

15. The apparatus according to claim 11, wherein said exhaustible module comprises a module adapted to be replaced by end users of said printing apparatus.

16. An apparatus comprising:
an exhaustible module for use within a printing apparatus, wherein said printing apparatus has a central processor, a printing engine, and a graphic user interface;
an electronic memory within said exhaustible module; and
a module processor within said exhaustible module,
wherein said electronic memory is adapted to store a return address,
wherein said exhaustible module has a useful life shorter than a useful life of said apparatus, such that said exhaustible module is adapted to be regularly consumed and replaced a plurality of times during said useful life of said apparatus,
wherein, when a predetermined amount of said useful life of said exhaustible module has expired, said module processor is adapted to send a module replacement notice to said central processor, wherein said module replacement notice includes said return address;
wherein, in response to said module exhaustion notice, said module processor is adapted to:
automatically provide said module replacement notice to a user through said graphic user interface; and
automatically print, using said printing engine, a return shipping label having said return address for use in shipping said exhaustible module after said exhaustible module is removed from said apparatus.

17. The apparatus according to claim 16, wherein said module replacement notice includes a remaining useful life amount of said exhaustible module, and wherein said central processor is further adapted to provide said remaining useful life amount to a user through said graphic user interface.

18. The apparatus according to claim 16, wherein said return address is stored only in said electronic memory of said exhaustible module.

19. The apparatus according to claim 16, wherein, in response to said module exhaustion notice, said module processor is further adapted to automatically order a replacement exhaustible module.

20. The apparatus according to claim 16, wherein said apparatus comprises one of an electrostatographic device and a xerographic device.

* * * * *